US009791316B2

United States Patent
Ritter et al.

(10) Patent No.: US 9,791,316 B2
(45) Date of Patent: Oct. 17, 2017

(54) SYSTEM AND METHOD FOR CALIBRATING IMAGING MEASUREMENTS TAKEN FROM AERIAL VEHICLES

(71) Applicant: SlantRange, Inc., San Diego, CA (US)

(72) Inventors: Michael Ritter, San Diego, CA (US); Michael Milton, San Diego, CA (US)

(73) Assignee: SLANTRANGE, INC., San Diego, CA (US)

(*) Notice: Subject to any disclaimer, the term of this patent is extended or adjusted under 35 U.S.C. 154(b) by 0 days.

(21) Appl. No.: 15/275,194

(22) Filed: Sep. 23, 2016

(65) Prior Publication Data

US 2017/0010155 A1 Jan. 12, 2017

Related U.S. Application Data

(63) Continuation of application No. 14/480,565, filed on Sep. 8, 2014, now Pat. No. 9,470,579.

(51) Int. Cl.
| | |
|---|---|
| *G01J 3/46* | (2006.01) |
| *G01J 3/02* | (2006.01) |
| *G01J 3/28* | (2006.01) |
| *G01J 1/42* | (2006.01) |
| *G01J 1/44* | (2006.01) |
| *G01J 1/04* | (2006.01) |

(52) U.S. Cl.
CPC ........... *G01J 3/0297* (2013.01); *G01J 1/4204* (2013.01); *G01J 1/44* (2013.01); *G01J 3/2823* (2013.01); *G01J 1/0433* (2013.01); *G01J 1/0474* (2013.01); *G01J 2003/2826* (2013.01)

(58) Field of Classification Search
CPC ....... G01J 2003/2826; G01J 2003/2866; G01J 3/2823; G01J 1/4204; G01N 21/274; G01N 2021/1793; G01N 2021/1797
See application file for complete search history.

(56) References Cited

U.S. PATENT DOCUMENTS

| | | | |
|---|---|---|---|
| 3,392,645 A | 7/1968 | Neasham | |
| 3,638,026 A | 1/1972 | Myrsyl | |
| 4,128,760 A | 12/1978 | Del Signore, II | |
| 4,799,044 A | 1/1989 | Masters | |
| 6,160,902 A * | 12/2000 | Dickson | G01J 3/2803 348/144 |
| 6,422,508 B1 | 7/2002 | Barnes | |
| 6,792,684 B1 | 9/2004 | Hyyppa | |
| 6,963,405 B1 | 11/2005 | Wheel | |
| 7,088,261 B2 | 8/2006 | Sharp | |
| 7,346,217 B1 | 3/2008 | Gold | |

(Continued)

OTHER PUBLICATIONS

Corresponding application No. PCT/US2015/060382—International Preliminary Report of Patentability, dated May 26, 2017 (6 pages).

*Primary Examiner* — Michael A Lyons
*Assistant Examiner* — Maurice Smith
(74) *Attorney, Agent, or Firm* — Pillsbury Winthrop Shaw Pittman LLP

(57) ABSTRACT

Systems and methods are provided for calibrating spectral measurements taken of one or more targets from an aerial vehicle. Multiple photo sensors may be configured to obtain spectral measurements of one or more ambient light sources. The obtained spectral measurements of the one or more ambient light sources may be used to calibrate the obtained spectral measurements of the target.

18 Claims, 9 Drawing Sheets

(56) References Cited

U.S. PATENT DOCUMENTS

| | | |
|---|---|---|
| 8,174,693 B1 | 5/2012 | Matthews |
| 8,352,105 B2 | 1/2013 | Barnes |
| 8,544,573 B2 | 10/2013 | Gettings |
| 8,583,296 B2 | 11/2013 | Allen |
| 8,665,340 B2 * | 3/2014 | Prentice ............ G03B 7/08 348/207.99 |
| 2001/0016053 A1 * | 8/2001 | Dickson ............ G01J 3/2803 382/110 |
| 2002/0041377 A1 | 4/2002 | Hagiwara |
| 2003/0063338 A1 | 4/2003 | Gudaitis |
| 2005/0149235 A1 | 7/2005 | Seal |
| 2005/0151965 A1 | 7/2005 | Bissett |
| 2005/0205758 A1 | 9/2005 | Almeida |
| 2007/0002138 A1 | 1/2007 | Oldroyd |
| 2007/0046448 A1 | 3/2007 | Smitherman |
| 2007/0200052 A1 | 8/2007 | Seyfried |
| 2008/0178653 A1 | 7/2008 | Gunstream |
| 2009/0128816 A1 * | 5/2009 | Roman ............ G01N 21/8483 356/409 |
| 2009/0295910 A1 | 12/2009 | Mir |
| 2010/0013979 A1 | 1/2010 | Golub |
| 2011/0110562 A1 | 5/2011 | Kelle |
| 2012/0293803 A1 | 11/2012 | Arai |
| 2012/0321321 A1 | 12/2012 | Riesebosch |
| 2013/0278576 A1 | 10/2013 | Lee |
| 2014/0022381 A1 | 1/2014 | Heinold |
| 2014/0050406 A1 | 2/2014 | Buehler |
| 2014/0055784 A1 * | 2/2014 | Kremer ............ G01J 3/2823 356/302 |
| 2014/0132778 A1 | 5/2014 | Holub |

* cited by examiner

SYSTEM AND METHOD FOR CALIBRATING IMAGING MEASUREMENTS TAKEN FROM AERIAL VEHICLES

CROSS REFERENCE TO RELATED APPLICATIONS

The present application is a continuation of and claims priority benefit to U.S. patent application Ser. No. 14/480,565, filed Sep. 8, 2014, entitled "SYSTEM AND METHOD FOR CALIBRATING IMAGING MEASUREMENTS TAKEN FROM AERIAL VEHICLES," which is incorporated herein by reference in its entirety.

FIELD OF THE DISCLOSURE

This disclosure relates to systems and methods for obtaining calibrated images of a target area, and specifically relates to obtaining calibrated images of a target area taken from aerial vehicles.

BACKGROUND

The spectral content of electromagnetic waves reflected off of, or emitted from, a target provides information about the properties of that target. In some circumstances, the spectral content of the electromagnetic waves reflected off of, or emitted from, a target provides information about the chemical composition of the target. Based on the information provided by the reflected and/or emitted electromagnetic waves, the target can be classified. For example, the target's composition may be determined. In cases where the target is vegetation, it may be possible to determine a condition of the vegetation.

Multi-spectral imaging (MSI) and hyperspectral imaging (HSI) systems, which are capable of capturing incident light as a function of spectral wavelength, may be used to collect such information about a target for a large variety of applications.

The electromagnetic waves that are reflected off of a target are from a light source. Therefore, the spectral content of the electromagnetic waves reflected off of a target will also be a product of the electromagnetic waves provided by the light source. Different light sources and different conditions affecting a light source will cause the spectral content of the electromagnetic waves from the light source to differ. Therefore, it is necessary to provide systems and methods to calibrate the spectral content measurements captured of the target.

Calibration systems have been used whereby the target is illuminated by an artificial light source having a known spectral content. Calibration systems have been used whereby a target calibration panel having a known spectral reflectance has been placed in the field of view of the target spectral measurement devices and used to calibrate the target spectral measurements. Calibration systems have also been used which measure the spectral content of the light sources directly.

SUMMARY

Prior methods and systems for calibrating spectral images of targets are especially impractical for use in small aerial vehicles. Existing methods either require logistically impractical steps for inserting known reflectance objects within the target scene, or require on-board sensing systems which are impractical for use on very small aircraft with extreme weight and power constraints. This disclosure relates to obtaining calibrated images of a target area, and specifically obtaining calibrated images of a target area obtained using airborne vehicles. Spectral measurements of a target and/or target area may be calibrated by direct spectral measurements of the ambient light source(s). The calibration may be performed by obtaining spectral measurements of one or more ambient light sources across discrete spectral frequency ranges with photo sensors having extremely low size, weight, and power. The spectral frequency ranges of the spectral measurements of the ambient light source may correlate with the spectral measurements of the target(s) and/or target area(s). Such systems and methods provide an advantage over the prior art because they are lightweight, have reduced power requirements, and provide a calibration correction for each spectral image that accounts for changes in ambient illumination conditions that vary from sample to sample.

Spectral measurements may include intensity measurements, luminosity measurements, luminous flux measurements, luminous power measurements, wavelength measurements, frequency measurements, brightness, and/or other measurements of electromagnetic waves.

One aspect of the disclosure relates to a system for obtaining calibrated spectral measurements of a target. The system may comprise an aerial vehicle. The aerial vehicle may be a manned or unmanned aerial vehicle. The aerial vehicle may be an unmanned aerial system, a remotely piloted aircraft, and/or other aerial vehicle. The aerial vehicle may have a propulsion type being one or more of vertical rotor, horizontal rotor, jet propelled, and/or other propulsion type. The aerial vehicle may be a passive aerial vehicle having no active propulsion type. The aerial vehicle may be a balloon, glider, or other vehicle.

The system may comprise at least one spectral imaging device. The at least one spectral imaging device may be configured to obtain spectral measurements of a target. The target may be at least partially illuminated by one or more ambient light sources. The ambient light sources may be one or more of the sun, reflected light from the moon, star light, artificial light, natural light, and/or other light sources. The spectral imaging device may be configured to obtain spectral measurements of the target in discrete frequency ranges. The spectral imaging device may be configured to obtain spectral measurements of the target across a continuous frequency range. The continuous frequency range may span across one or more selected discrete frequency ranges. The one or more discrete frequency ranges may be selected based on a desired information type. The spectral measurements of the target may comprise a first set of spectral measurements of the target. The first set of spectral measurements of the target may comprise spectral measurements of the target taken across one or more discrete frequency ranges.

The spectral imaging device may be configured to obtain measurements of the target over spectral frequency ranges spanning across the ultraviolet, visible, near infrared, and infrared regions of the electromagnetic spectrum.

As used herein, the target may be a single target, multiple targets, a target area or target areas, and/or any other target.

The system may comprise one or more photo sensors. The one or more photo sensors may be configured to obtain spectral measurements of the one or more ambient light sources. The one or more photo sensors may have peak responses approximate to a first set of discrete spectral frequency ranges. The one or more photo sensors may be configured to obtain spectral measurements of the one or more ambient light sources at individual ones of the first set of discrete spectral frequency ranges. Individual ones of the one or more photo sensors may have a peak response range approximate to individual ones of the first set of spectral frequency ranges. The one or more photo sensors may comprise a first photo sensor. The first set of spectral frequency ranges may comprise a first spectral frequency range. The first photo sensor may have a peak response approximate to a first spectral frequency range. The first photo sensor may be configured to obtain a first spectral measurement of the one or more ambient light sources over the first spectral frequency range.

The sets of spectral frequency ranges may include any number of frequency ranges. Individual ones of the spectral frequency ranges may overlap. For example, the first set of spectral frequency ranges may include: a first discrete frequency range, a second discrete frequency range, a third discrete frequency range, a fourth discrete frequency range, a fifth discrete frequency range, and other discrete frequency ranges. The photo sensors may be configured to obtain spectral frequency measurements of the one or more ambient light sources and may include a first photo sensor having a peak response range approximate to a first spectral frequency range, a second photo sensor having a peak response range approximate to a second spectral frequency range, a third photo sensor having a peak response range approximate to a third spectral frequency range, a fourth photo sensor having a peak response range approximate to a fourth spectral frequency range, a fifth photo sensor having a peak response range approximate to a fifth spectral frequency range, and one or more other photo sensors having peak response ranges approximate one or more other spectral frequency ranges.

The photo sensors may be one or more of light-emitting diodes (LEDs), photodiodes, and/or other sensor. The photo sensors may comprise one or more light-diffusing elements configured to integrate downwelling illumination from the one or more ambient light sources. One or more electrical amplifiers may be electronically connected to the photo sensors. The one or more amplifiers may be configured to amplify the measurements obtained by the photo sensors.

The circuit may comprise a conversion circuit. The conversion circuit may be employed, wherein the amplifier(s) may be configured to convert the photo sensors' output current to an output voltage. The circuit may comprise an analog-to-digital converter configured to convert the voltage signal into a digital value for individual images collected by the spectral imaging devices.

The obtained spectral measurements of the one or more ambient light sources may be used to calibrate the obtained spectral measurements of the target. The first set of target spectral measurements may be calibrated based on the first set of ambient light spectral measurements.

The system may be configured to determine a first set of calibration values for the first set of target spectral measurements. The first set of calibration values may be based on the first set of ambient light spectral measurements. The system may be configured to scale the first set of target spectral measurements based on the determined first set of calibration values.

The spectral measurements of the target may include measurements spanning over the first set of discrete frequency ranges. The one or more photo sensors may have peak response frequency ranges approximate to the discrete frequency ranges included in the spectral measurements of the target.

The system may comprise one or more processors configured by machine-readable instructions to carry out one or more functions. The one or more functions are herein described in relation to computer program components. One of ordinary skill in the art will understand and appreciate that the computer-readable instructions may or may not be created in discrete components corresponding to the one or more functions. One of ordinary skill in the art will understand and appreciate that the computer-readable instructions herein described may include computer-readable instructions created in one or more sets of programming code, in one or more separate computer programs, performed on one or more computing devices, and/or created in other forms.

The one or more processors may be configured by machine-readable instructions to perform the operations of a time component and/or other components. The time component may be separate from the other components. The time component may comprise individual time components for each sensor. The time component may be configured to obtain time data and/or information associated with the obtained measurements. For example, a first set of time data may be obtained for the first set of measurements of the target. The time component may be configured to obtain time data associated with the obtained spectral measurements of the one or more ambient light sources. For example, a first set of time data may be obtained for the first set of ambient light spectral measurements. The first set of time data obtained for the first set of ambient light spectral measurements may be the same as the first set of time data obtained for the first set of target spectral measurements.

The system may comprise one or more electronic data storage mediums configured to receive the obtained spectral measurements of the target and the obtained spectral measurements of the one or more ambient light sources, such that the electronic data storage mediums are configured to receive the first set of measurements of the target, the first set of ambient light spectral measurements, and/or other measurements. The one or more electronic data storage mediums may be mounted to the aerial vehicle and may be in electronic communication with the spectral imaging device(s), the photo sensor(s) and/or other sensors and/or elements.

The system may comprise one or more thermometers configured to measure the temperature of the spectral imaging devices(s), the photo sensors, and/or other sensors and/or elements. The electronic storage medium(s) may be in electronic communication with the thermometer(s) and may be configured to receive temperature data associated with the spectral imaging devices(s), photo sensors, and/or other sensors and/or elements. The data associated with the temperature information, spectral measurements of the target, spectral measurements of the one or more ambient light sources and/or other obtained information may be stored on the electronic storage medium(s) together with the associated time information of the measurements and/or the obtained information.

The system may comprise an attitude component. The attitude component may be configured to obtain an attitude of the spectral imaging devices(s), the one or more photo sensors, and/or other sensors and/or elements. The system may comprise a position sensor. The position sensor may be configured to obtain position information of the system. The position sensor may be configured to obtain position information of individual ones of the one or more sensors and/or elements.

The time component may be configured to obtain time information associated with the one or more target spectral measurements, the ambient light spectral measurements, the one or more temperature measurements, the one or more attitude measurements, the one or more position measurements, and/or other measurements. The first set of target spectral measurements, the first set of ambient light spectral measurements, the first set of temperature measurements, the first set of attitude measurements, the first set of location measurements, and/or other measurements, may be obtained concurrently, or near concurrently, and may be collectively referred to as the first set of measurements. The time component may be configured to obtain a first set of time information associated with the first set of measurements.

The at least one spectral imaging device may be configured to obtain a first set of spectral measurements of the target across the first set of spectral frequency ranges at a first time. The at least one spectral imaging device may be configured to obtain a second set of spectral measurements of the target across the first set of spectral frequency ranges at a second time. The one or more photo sensors may be configured to obtain a first set of spectral measurements of the one or more ambient light sources across the first set of spectral frequency ranges at the first time. The one or more photo sensors may be configured to obtain a second set of spectral measurements of the target across the first set of spectral frequency ranges at the second time. The first set of spectral measurements of the target may be calibrated based on the first set of spectral measurements of the ambient light source(s). The second set of spectral measurements of the target may be calibrated based on the second set of spectral measurements of the ambient light source(s).

The system may comprise an environmental parameter component. The environmental parameter component may be configured to obtain environmental parameter information. The environmental parameter information may be associated with the spectral measurements of the target and/or the spectral measurements of the ambient light source(s). The spectral measurements of the target may be calibrated using the obtained environmental parameter information. The obtained environmental parameter information may be correlated with the first set of measurements based on the time information.

Another aspect of this disclosure relates to a method for obtaining calibrated images of a target area. The method may comprise the steps of obtaining spectral measurements of a target. The target may be at least partially illuminated by one or more ambient light sources. The method may comprise obtaining spectral measurements of the one or more ambient light sources across a first set of discrete spectral frequency ranges. The spectral measurements across the first set of discrete spectral frequency ranges may include a first spectral measurement of the one or more ambient light sources over a first spectral frequency range. The obtained spectral measurements of the one or more ambient light sources may be used to calibrate the obtained spectral measurements of the target. For example, the first set of spectral measurements of the target may be calibrated based on the first set of spectral measurement of the one or more ambient light sources.

Another aspect of the disclosure relates to a method for calibrating spectral measurements of a target. The method may comprise obtaining target spectral measurement data associated with one or more targets. The target spectral measurement data may have been obtained using an aerial vehicle. The method may comprise obtaining ambient light spectral measurement data associated with one or more ambient light sources. The ambient light spectral measurement data may have been obtained using an aerial vehicle. The target spectral measurements, the ambient light spectral measurements, and/or other measurements may be taken by the same or different aerial vehicles.

The method may comprise determining sets of calibration values for the obtained target spectral measurement data. The determination of the calibration values may be based on the obtained ambient light spectral measurement data. The method may comprise scaling the obtained target spectral measurement data with the determined sets of calibration values. Scaling the obtained target spectral measurement data may provide calibrated spectral measurements of the one or more targets.

The obtained target spectral measurement data may comprise spectral measurement data associated with a first set of spectral frequency ranges. The obtained ambient light spectral measurement data may comprise spectral measurement data associated with the first set of spectral frequency ranges. The step of determining the sets of calibration values for the obtained target spectral measurement data may comprise determining individual ones of the sets of calibration values based on the spectral measurement data associated with individual ones of the first set of spectral frequency ranges.

The target spectral measurement data and the ambient light spectral measurement data may be obtained by a server. The server may be in electronic communication with the sensors that obtained the data. The server may be in electronic communication with storage devices used to store the data obtained from the sensors. The server may be physically remote from the sensors and/or electronic storage device. The data may be obtained by a client-computing device associated with an operator of an aerial vehicle from which the data has been obtained. The data may be processed by the server, the client computing device, and/or other devices.

The system may comprise one or more data connections configured to electronically connect to one or more electronic data storage mediums on an aerial vehicle. The one or more data connections may be wired and/or wireless connections. The one or more data connections may be direct or indirect. The data connection(s) may be configured to continuously provide data from the electronic storage mediums and/or the sensors on the aerial vehicle. The data connection(s) may be configured to periodically provide data from the electronic storage mediums and/or the sensors on the aerial vehicle. The data connection(s) may be configured to provide data from the electronic storage mediums and/or the sensors on the aerial vehicle when connected to devices configured to retrieve the data, wherein the devices download all, substantially all, or select portions of the data. The data may be transferred to one or more other electronic storage devices prior to processing.

The electronic data storage medium(s) may be configured to store spectral measurements of a target taken from an aerial vehicle. The electronic storage medium(s) may be configured to store spectral measurements of one or more ambient light sources.

The system may comprise one or more physical computer processors configured by machine-readable instructions to perform the functions of one or more computer components. The one or more computer components may comprise a calibration component, an environmental parameter component, and/or a theoretical model component.

The calibration component may be configured to determine sets of calibration values for the spectral measurements of the target. The sets of calibration values may be determined based on the obtained spectral measurements of the one or more ambient light sources and/or other sources.

The environmental parameter component may be configured to obtain sets of environmental parameters associated with the spectral measurements of the target. The environmental parameter component may be configured to obtain sets of environmental parameters associated with the spectral measurements of the one or more ambient light sources. The environmental parameters may include temperature measurements of and/or adjacent to the multiple photo sensors configured to obtain spectral measurements of the one or more ambient light sources. The environmental parameters may include temperature measurements of and/or adjacent to the spectral imaging device configured to obtain spectral measurements of the one or more targets. Temperature measurements of the photo sensors may be obtained to correct for thermal responsivity effects of the photo sensors. The environmental parameters may include one or more of the geographical location, the attitude, the altitude, the transmission properties of the photo sensors, and/or other environmental parameters. The environmental parameters may include one or more of the time of year the measurements were taken, the time of day the measurements were taken, the atmospheric properties at the time the measurements were taken, and/or other environmental parameters.

The theoretical model component may be configured to determine a theoretical irradiance model for the target based on the obtained sets of environmental parameters. The theoretical model component may be configured to determine the theoretical irradiance model for the target based on an atmospheric transmission model.

The calibration component may be configured to determine sets of calibration values for the spectral measurements of the target. The sets of calibration values may be determined based on the obtained spectral measurements of the one or more ambient light sources. The sets of calibration values may be determined based on the theoretical irradiance model for the target.

The calibration component may be configured to determine a calibration value for the spectral measurements of the target. For example, where the spectral imaging devices are configured to obtain spectral measurements of a target, a calibration value may be determined for the spectral frequency ranges and/or spectral bands in which the spectral measurements were taken. Individual calibration values may be determined for the individual spectral frequency ranges and/or spectral bands. A calibration value may be determined for, and may be applicable to, multiple spectral frequency ranges and/or spectral bands.

The calibration component may be configured to scale the spectral measurements of the target with the determined sets of calibration values. Scaling the spectral measurements of the target with the determined sets of calibration values may provide spectral measurements of the target that is independent, or nearly independent, of ambient light illumination conditions.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Prior methods and systems of calibrating spectral images of targets are especially impractical for use in small aerial vehicles. Existing methods either require logistically impractical steps for inserting known reflectance objects within the target scene, or require on-board sensing systems which are impractical for use on very small aircraft with extreme weight and power constraints. This disclosure relates to obtaining calibrated spectral images of target(s) and/or target area(s) using spectral measurements obtained from aerial vehicles. The systems and methods may include calibrating spectral images of target(s) using measurements of the spectral characteristics of the incident illumination within discrete and/or narrow spectral bands that may be selected to match the bands of the spectral imager. The measurements of the spectral characteristics of incident illumination may be synchronized to the spectral measurements of the target(s). Such systems and methods provide an advantage over the prior art because they are lightweight, have reduced power requirements, and provide a calibration correction for each spectral image that accounts for changes in ambient illumination conditions that vary from sample to sample.

Figure 1:
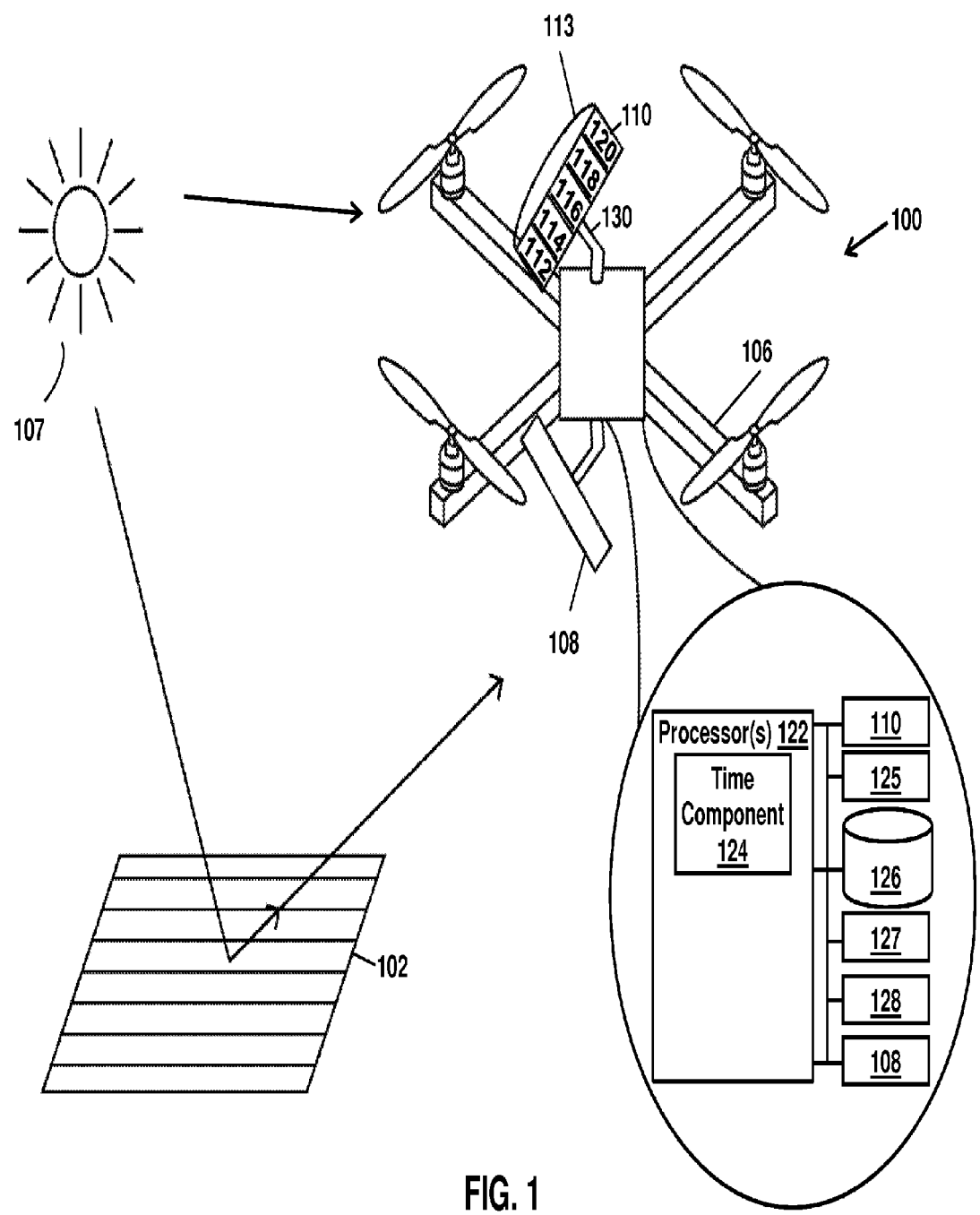
FIG. 1 illustrates a system for obtaining calibrated spectral measurements of a target illuminated by ambient light and/or other sources, in accordance with one or more implementations.

FIG. 1 illustrates a system 100 for obtaining calibrated spectral images of a target 102. The target 102 may be illuminated by one or more ambient light sources 107. The target 102 may be an individual target, a group of targets, an area, and/or any desired target. The system 100 may be configured to obtain calibrated spectral images of a target, wherein the spectral images are obtained using an aerial vehicle 106. The aerial vehicle shown in FIG. 1 is an unmanned vehicle, or a remotely piloted vehicle. However, the aerial vehicle 106 may be any type of aerial vehicle, including piloted and non-piloted aerial vehicles. The aerial vehicle 106 may be an autonomous aerial vehicle capable of flying missions without continuous or periodic intervention by a pilot, whether directly or remotely. The aerial vehicle may be a helicopter, quadcopter, hexacopter, octocopter, an aerial vehicle having horizontal, or near horizontal, propellers, an aerial vehicle having vertical, or near vertical, propellers, an aerial vehicle having jet propulsion, a plane, a satellite, a balloon, a flying ship, or any other type of aerial vehicle capable of facilitating the obtaining of spectral images of a target from an elevated position. In some implementations, spectral images may include spectral measurements and/or other ways of obtaining spectral information of a target(s).

Spectral measurements may include intensity measurements, luminosity measurements, luminous flux measurements, luminous power measurements, wavelength measurements, frequency measurements, brightness, other measurements in the electromagnetic spectrum, and/or other measurements.

The aerial vehicle 106 may be capable of carrying, and/or being configured to carry, at least one spectral imaging device 108. The aerial vehicle 106 may be capable of carrying, and/or being configured to carry, one or more photo sensors 110. The spectral imaging device 108 may be configured to obtain spectral images and/or measurements of a target 102. The spectral imaging device 108 may be one or more of a multispectral or hyperspectral still image or video camera, an array of charge-coupled devices or complimentary metal oxide semiconductors, LEDs, photo sensors, and/or other image and/or spectral measuring devices.

The target 102 may be illuminated by one or more ambient light sources 107. The ambient light sources 107 may be direct and/or indirect light sources. The ambient light sources 107 may be one or more of the sun (as shown in FIG. 1), the moon, starlight, artificial light, natural light, any combination of reflected and/or transmitted light sources, and/or other light sources.

The spectral imaging device 108 may be configured to obtain signals reflected and/or emitted from the target at a set of predefined spectral bands and/or spectral frequency ranges. The predefined spectral bands and/or spectral frequency ranges may be across one or more of the ultraviolet, the visible, the near-infrared, and/or the infrared regions of the electromagnetic spectrum. The photo sensors may be configured to obtain spectral measurements of characteristics of the electromagnetic radiation from one or more ambient light sources 107. The one or more ambient light sources 107 may provide illumination and/or part of the illumination of the one or more targets 102. The photo sensors 110 may be configured to obtain spectral measurements of the ambient light source(s) 107 in the same frequency bands as obtained for the target 102 by the spectral imaging device 108.

The photo sensors 110 may be mounted to the aerial vehicle 106. The mount 130 may be configured to facilitate orientation of the photo sensors 110. The photo sensors 110 may be oriented in a desired manner. For example, the photo sensors 110 may be oriented toward the one or more ambient light sources 107. The photo sensors may be oriented at a desired angle relative to the target(s) 102. The photo sensors may be oriented individually, as groups of photo sensors, or as a combined whole.

Figure 2A:
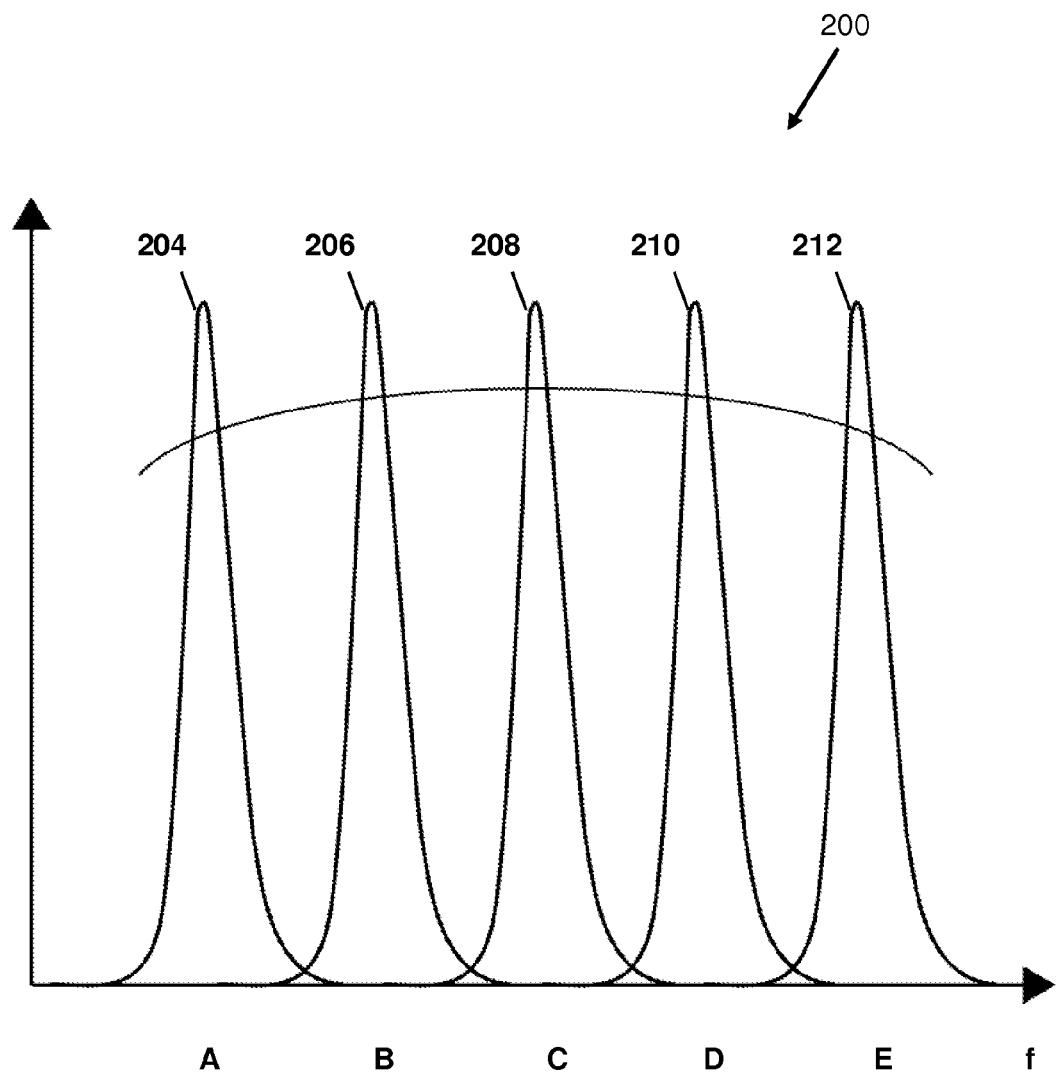
FIGS. 2A and 2B provide simplistic illustrations of examples of the spectral measurement curves of the spectral imaging device(s) and the photo sensor(s), in accordance with one or more implementations.
Figure 2B:
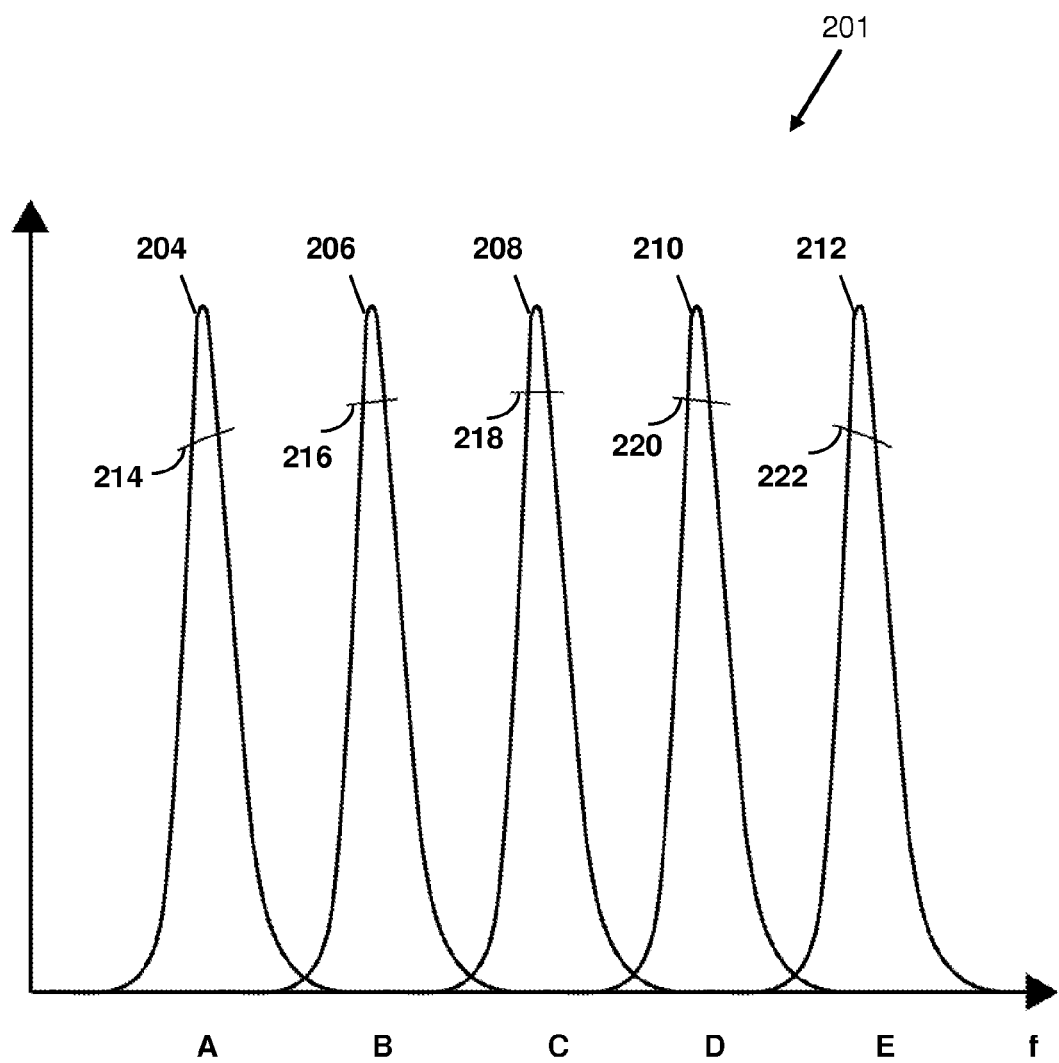

Individual ones of the set of photo sensors 110 may have a peak response parameter range approximate to individual ones of the spectral bands and/or spectral frequency ranges of the spectral imaging device 108. An example of such a spectral imaging device may be a multispectral imager. In some implementations, the spectral imaging device 108 may comprise one or more sensors having a continuous spectral response across a range of spectral frequencies. In some implementations, and as shown in FIGS. 2A and 2B, the spectral imaging device 108 (as shown in FIG. 1) may comprise one or more sensors wherein individual ones of the one or more sensors have a spectral response across subsets of discrete spectral frequency ranges within a wider spectral frequency range. Individual ones of the set of photo sensors 110 may have a peak response parameter range at spectral positions selected at discrete bands spanning the continuous spectral response of the spectral imaging device 108, as shown in FIG. 2A. An example of such a spectral imaging device 108 may be a hyperspectral imager. In the case of the spectral imaging device 108 comprising one or more sensors wherein individual ones of the one or more sensors have a response range across a discrete subset of spectral frequency ranges within a wider range of spectral frequencies, individual ones of the photo sensors 110 may have a peak response parameter corresponding to the discrete subset of spectral frequency ranges of the spectral imaging device 108, as shown in FIG. 2B.

For example, the multiple photo sensors 110 may comprise a first photo sensor 112 having a peak response parameter range approximate to a first spectral frequency range of the spectral imager 108. The first photo sensor 112 may be configured to obtain a first spectral measurement of the ambient light sources 107 and/or other sources. Similarly, a second photo sensor 114 may be provided having a peak response parameter range approximate to a second spectral frequency range of the spectral imager 108. The second photo sensor may be configured to obtain a second spectral measurement of the ambient light sources 107 and/or other sources. The system may comprise multiple photo sensors, such as photo sensors 114, 116, 118, 120, and other photo sensors, configured to obtain spectral measurements in multiple different frequency ranges. The individual photo sensors of the multiple photo sensors 110 may have different peak response ranges. Two or more of the individual photo sensors of the multiple photo sensors 110 may have the same and/or similar peak response ranges.

The multiple photo sensors 110 configured to obtain spectral measurements of the one or more ambient light sources 107 may include a third photo sensor 116 having a peak response parameter range approximate to a third spectral frequency range. The third photo sensor 116 may be configured to obtain a third set of ambient light measurements. The multiple photo sensors 110 may include a fourth photo sensor 118 having a peak response parameter range approximate to a fourth spectral frequency range. The multiple photo sensors 110 may include a fifth photo sensor 120 having a peak response parameter range approximate to a fifth spectral frequency range. The fourth and fifth photo sensors may be configured to obtain a fourth and fifth set of ambient light measurements. The multiple photo sensors 110 may include multiple photo sensors having peak response parameter ranges approximate to multiple spectral frequency ranges. Individual ones of the multiple photo sensors may be configured to have a peak response parameter range approximate to individual ones of the multiple spectral frequency ranges of the spectral imaging device.

FIGS. 2A and 2B provide simplistic illustrations of examples of the spectral measurement curves of the spectral imaging device 108 and the one or more photo sensors 110. FIG. 2A shows a first plot 200 of an example of a spectral measurement curve 202 for a spectral imaging device 108. The spectral imaging device 108 may be configured to obtain spectral images and/or measurements of the target 102 over a continuous range of frequencies. An example of such a spectral imaging device may be a hyperspectral imager. The system 100 may comprise one or more photo sensors 110. The photo sensors 110 may be configured to obtain a first set of measurements of the ambient light source 107. The first set of measurements of the ambient light source 107 may comprise measurements of the ambient light source taken over a first frequency range and/or band. The multiple photo sensors 110 may comprise one or more sensors having a peak response within a first spectral frequency range or band A. As shown in FIG. 2A, the one or more sensors having a peak response within a first spectral frequency range may have a peak response curve 204 across a first spectral frequency range or band A.

Similarly, the first set of measurements of the ambient light source 107 may comprise measurements of the ambient light source taken over a second frequency range and/or band. The multiple photo sensors 110 may comprise one or more sensors having a peak response within the second spectral frequency range and/or band B. As shown in FIG. 2A, the one or sensors having a peak response within the second spectral frequency range may have a peak response curve 206 across a second spectral frequency range or band B.

The first set of measurements of the ambient light source 107 may comprise measurements of the ambient light source taken over a third, fourth, fifth, or more, spectral frequency ranges and/or bands, C, D, and E. The multiple photo sensors 110 may comprise one or more sensors having peak responses within the third, fourth, fifth, or more, spectral frequency ranges and/or bands. As shown in FIG. 2A, the one or more sensors having a peak response within the third, fourth, fifth, or more, spectral frequency ranges and/or bands may have peak response curves 208, 210, 212, across the third, fourth, fifth, and more spectral frequency ranges and/or bands C, D, and E.

FIG. 2B shows a second plot 200 of an example of spectral measurement curves for a spectral imaging device 108, wherein the spectral imaging device 108 is configured to obtain spectral images and/or measurements across discrete frequency ranges or bands. An example of such a spectral imaging device 108 may be a multispectral imager. The spectral images and/or measurements obtained of the target by the spectral imaging device 108 may comprise a first set of spectral measurements of the target taken over a first set spectral frequency ranges and/or bands. As shown in FIG. 2B, the spectral imaging device 108 configured to obtain spectral measurements over one or more discrete frequency ranges and/or bands may comprise one or more sensors having a peak response over a first spectral frequency range and/or band A providing a first spectral curve 214. Similarly, the imaging device 108 configured to obtain spectral measurements over one or more discrete frequency ranges may comprise one or more sensors having a peak response over a second B, third C, fourth D, fifth E, and more spectral frequency ranges and/or bands, providing a second 216, third 218, fourth 220, fifth 222, and more, spectral curves.

The first set of images and/or measurements of the target 102 may provide information about the spectral irradiance and/or reflection of the target 102. The spectral imaging device(s) 108 may be configured to obtain measurements over preselected spectral frequency ranges. The spectral imaging device(s) 108 may comprise sensors dynamically configured to adjust their detecting frequency to obtain measurements over dynamically selected spectral frequency ranges.

The spectral frequency ranges selected for the multiple photo sensors may be selected based on parameters providing an indication of a type of information obtained from measurements over the selected frequency ranges.

The multiple photo sensors 110 may have peak spectral sensitivities in any number of spectral frequency ranges and/or spectral bands. For example, a matrix of multiple photo sensors may have peak sensitivity ranges in one, two, three, four, five, and more spectral frequency ranges or bands. The width of the spectral frequency ranges and/or bands may be any size. For example, the spectral frequency ranges and/or bands may be limited to a single nanometer, or may be many nanometers. The width of the spectral frequency ranges or bands may be selected to have a range indicative of providing a desired set of information or indicative of providing a desired outcome.

In some implementations, the multiple photo sensors 110 may be configured in an array. In some implementations, the multiple photo sensors 110 may be disposed in the system 100 individually. The system 100 may comprise a diffusing element 113 configured to reduce the directionality of the electromagnetic radiation received by the multiple photo sensors 110.

The multiple photo sensors 110 may be comprised of light-emitting diodes (LEDs) configured and operated as light collection sensors. The LEDs may be configured such that individual ones of the LEDs are selected based on the LED's responsivity within individual ones of the predefined spectral bands.

Figure 3:
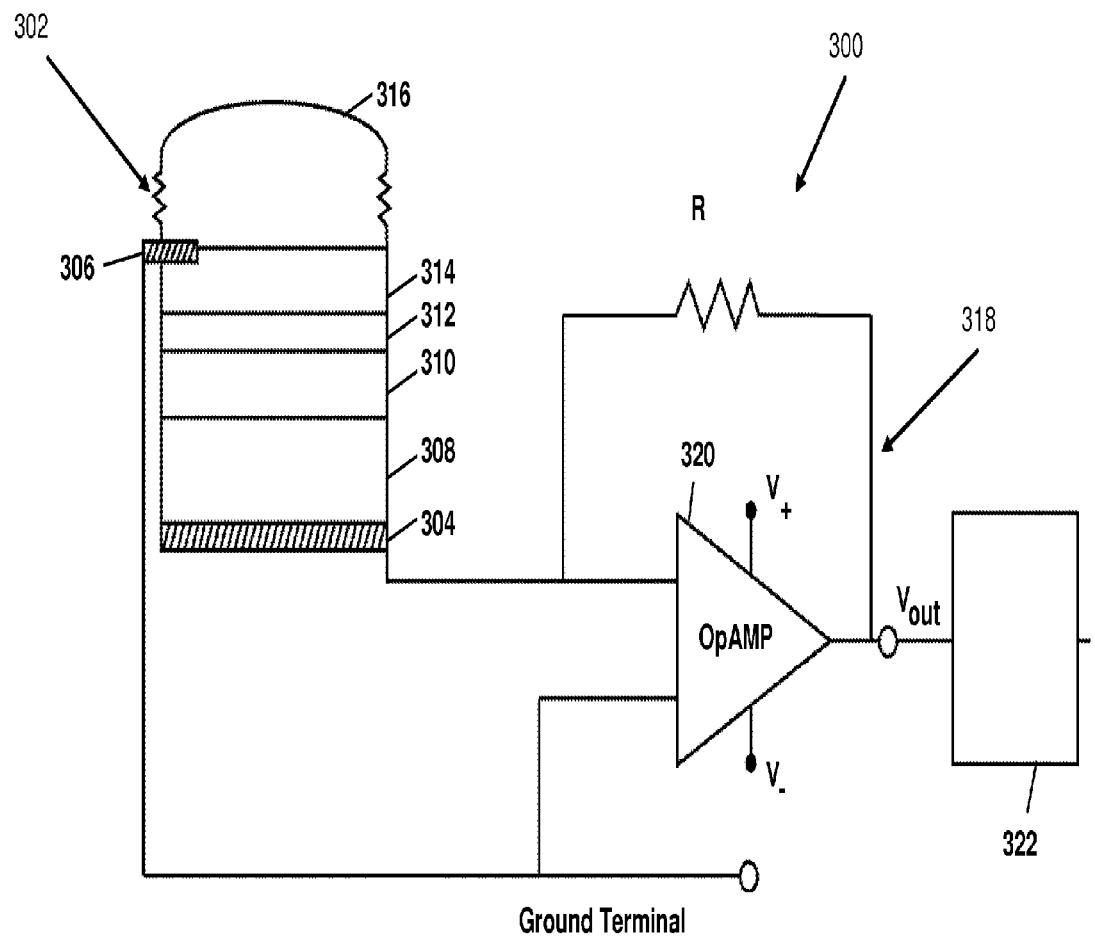
FIG. 3 illustrates a schematic view of a circuit used in calibrating spectral measurements of a target illuminated by ambient light and/or other sources, in accordance with one or more implementations.

FIG. 3 illustrates a schematic view of a circuit 300 used in obtaining calibrated spectral images and/or measurements of a target and/or target area illuminated by ambient light sources and/or other sources, in accordance with one or more implementations. There may be a circuit 300 that may comprise a LED 302. The LED 302 may comprise an anode 304 and a cathode 306. The LED 302 may comprise a substrate 308, an n-layer 310, an active region 312, a p-layer 314, and one or more other elements. In some implementations, the LED may comprise one or more light diffusing elements. The light diffusing elements may be configured to integrate downwelling illumination from the one or more ambient light sources. In some implementations, the circuit 300 may comprise a light diffusion optic 316 configured to cover one or more of the LEDs 302.

The circuit 300 may comprise an amplification circuit 318 comprising one or more electrical amplifiers 320. The amplification circuit may be electronically connected to the LEDs 302. The one or more amplifiers 320 may be configured to amplify the measurements obtained by the one or more LEDs 302. For example, the one or more electrical amplifiers 320 may amplify the first set of ambient light measurements and the second set of ambient light measurements obtained by the LEDs 302.

The circuit 300 may be configured such that the output at $V_{out}$ may be proportional to the incident photon flux within the LED's spectral band. The circuit may comprise a conversion circuit which may be employed, wherein the LED current is converted to a voltage and amplified in proportion to the feedback resistance across the amplifier(s) 320. The circuit 300 may comprise an analog-to-digital converter 322 configured to convert the voltage signal into a digital value for the measurements collected by the LEDs 302.

Figure 4:
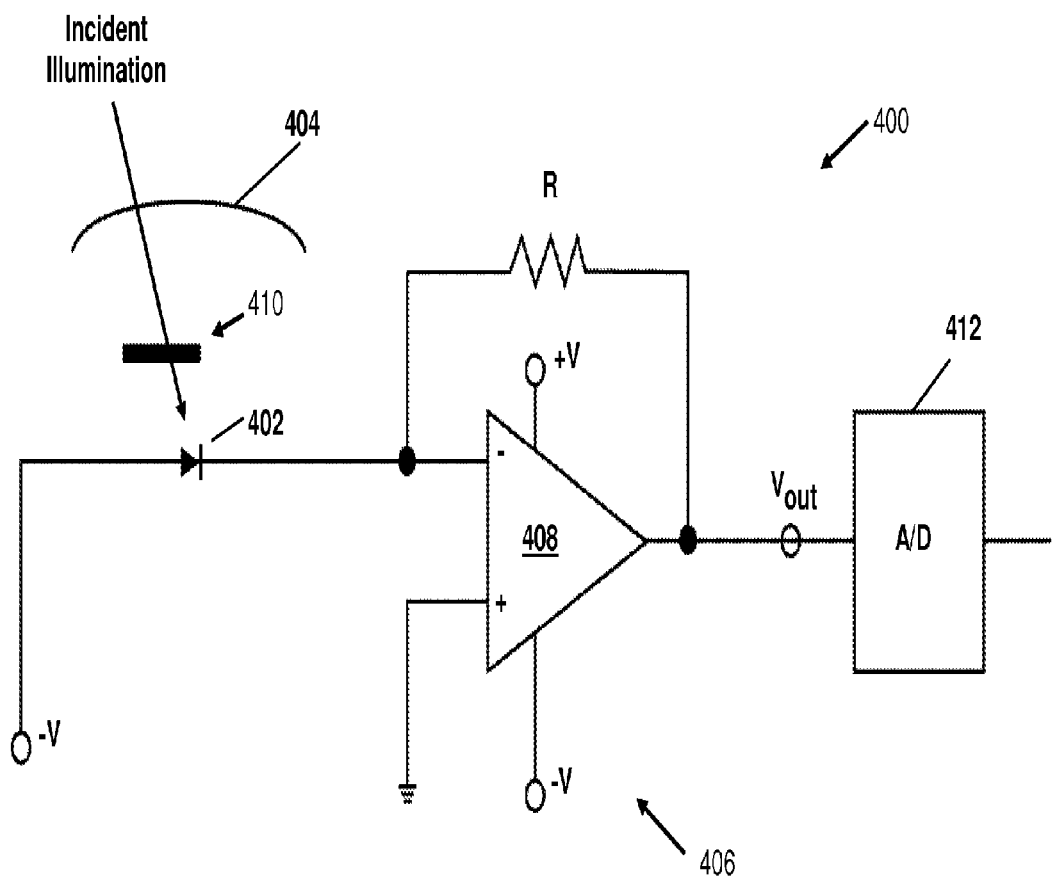
FIG. 4 illustrates a schematic view of a circuit used in calibrating spectral measurements of a target illuminated by ambient light and/or other sources, in accordance with one or more implementations.

The multiple photo sensors 310 may be comprised of photodiodes. FIG. 4 illustrates a schematic view of an assembly and circuit 400 used in obtaining calibrated spectral images and/or measurements of a target and/or target area illuminated by ambient light sources and/or other sources, in accordance with one or more implementations. Individual ones of the photodiode assemblies 402 may comprise a bandpass light filter element 410. The bandpass light filter element 410 of the individual photodiodes 402 may be selected based on its restriction of incident illumination to predefined and/or preselected spectral bands approximate to individual ones of the spectral imaging device's 408 spectral bands.

In some implementations, the photodiode(s) 402 may comprise one or more light diffusing elements 404. The light diffusing elements 404 may be configured to integrate downwelling illumination from the one or more ambient light sources. In some implementations, the circuit 400 may comprise a light diffusion optic 404 configured to cover one or more of the photodiodes 402.

The circuit 400 may comprise an amplification circuit 406 comprising one or more electrical amplifiers 408. The amplification circuit may be electronically connected to the photodiodes 402. The one or more amplifiers 408 may be configured to amplify the measurements obtained by the one or more photodiodes 402. For example, the one or more electrical amplifiers 402 may amplify the first set of ambient light measurements obtained by the photodiodes 402.

The circuit 400 may be configured such that the output at $V_{out}$ may be proportional to the incident photon flux within the spectral bandpass region of the bandpass light filter 410. The circuit 400 may comprise a conversion circuit which may be employed, wherein the photodiode's output current is converted to a voltage and amplified in proportion to the feedback resistance across the amplifier(s) 408. The circuit 400 may comprise an analogue-to-digital converter 412 configured to convert the voltage signal into a digital value for the measurements collected by the photodiodes 402.

The obtained spectral measurements of the one or more ambient light sources 107 may be used to calibrate the obtained spectral measurements of the target 102. For example, the first set of measurements of the target 102 may be scaled based on a concurrently sampled, or near concurrently sampled, first set of ambient light spectral measurements. The first set of measurements of the target 102 taken by the spectral imaging device 108 may comprise measurements taken over a first spectral frequency range or band. The first set of measurements of the target 102 taken by the spectral imaging device 108 may comprise measurements taken over a second, third, fourth, fifth, and more, spectral frequency ranges or bands.

The obtained spectral measurements of the target may comprise a second set of spectral measurement of the target taken at a time different from the first set of spectral measurements of the target. The second spectral measurement of the target may be scaled based on a concurrently sampled, or near concurrently sampled, second set of ambient light spectral measurements.

With reference to FIG. 1, the system 100 may comprise a location sensor 125. The location sensor 125 may be configured to obtain a position of the aerial vehicle, the spectral imaging device, and/or the multiple photo sensors. The system 100 may comprise an altitude sensor 127. The altitude sensor 127 may be configured to obtain an altitude of the aerial vehicle, the spectral imaging device, and/or the multiple photo sensors.

In some implementations, the system 100 may comprise one or more processors 122 configured by machine-readable instructions to carry out one or more functions. The one or more functions are herein described in relation to computer program components. One of ordinary skill in the art will understand and appreciate that the computer-readable instructions may or may not be created in discrete components corresponding to one or more functions. One of ordinary skill in the art will also understand and appreciate that the computer-readable instructions herein described may include computer-readable instructions created in one or more sets of programming code, in one or more separate computer programs, performed on one or more computing devices, and/or created in other forms.

The one or more processors 122 may be configured by machine-readable instructions to perform the operations of a time component 124 and/or other components. In some implementations, the time component 124 may be configured to be independent of the one or more processors 122. The time component 124 may be configured to obtain time data and/or information associated with the obtained measurements of the sensors. For example, the time component 124 may be configured to obtain time data and/or information associated with the obtained spectral measurements of the target 102. The time component 124 may be configured to obtain time data and/or information associated with the obtained spectral measurements of the one or more ambient light sources 107. The time component 124 may be configured to obtain time data and/or information associated with the obtained attitude measurements by the one or more attitude sensors 127. The time component 124 may be configured to obtain time data and/or information associated with the obtained location information obtained by the one or more location sensors 125. The measurements and/or observations obtained by the sensors may be taken concurrently, or nearly concurrently. The time component 124 may be configured to facilitate recording the time at which the measurements and/or observations were obtained. The time component 124 may be configured to record and/or store a single time measurement for all measurements obtained concurrently, or near concurrently, by the sensors. The time component 124 may be configured to record and/or store time measurements for the individual measurements obtained concurrently by the individual sensors. The multiple time measurements of the individual measurements may be the same time measurement, or may be individual time measurements representing the time at which the individual sensors obtained the measurement and/or observation.

A first set of time data may be obtained for the first set of spectral measurements of the target 102. The time component 124 may be configured to obtain time data associated with the obtained spectral measurements of the one or more ambient light sources 107. The time component 124 may be configured to obtain time data associated with the one or more temperature readings obtained by the one or more thermometers 128.

The system 100 may comprise one or more temperature sensors 128 configured to measure one or more of the ambient temperature, the temperature of the multiple photo sensors 110, the temperature of the spectral imaging device(s) 108, the temperature of the location sensor(s) 125, the temperature of the altitude sensor(s) 125, and/or other temperature measurements. The temperature may be taken of the elements of the system or adjacent to the elements of the system.

The system 100 may comprise one or more electronic data storage mediums 126. The electronic storage mediums 126 may be configured to receive one or more of the obtained spectral measurements of the target 102 by the spectral imaging device 108, the obtained spectral measurements of the one or more ambient light sources 107 by the photo sensors 110, the position measurements, the attitude measurements, the temperature measurements, and/or other information, the ambient light sources, and/or other data. The one or more electronic data storage mediums 126 may be mounted to the aerial vehicle 106 and may be in electronic communication with the spectral imaging device(s) 108, the photo sensor(s) 110, the processor 122, and/or the position, attitude, and temperature sensors. The electronic storage mediums 126 may be a single electronic storage, or may be multiple electronic storage devices. For example, individual sensors may comprise their own electronic storage or the sensors may electronically connect, either wired or wirelessly, or otherwise, to shared electronic storage.

The electronic storage 126 may be in electronic communication with the thermometer(s) 128 and may be configured to receive temperature data associated with the multiple photo sensors 110 and/or spectral imaging device(s) 108. The data associated with temperature information, spectral measurements of the target, and the spectral measurements of the ambient light source may be stored on the electronic storage 126 together with associated time information of the measurements.

Electronic storage 126 may comprise electronic storage media that electronically stores information. The electronic storage media of electronic storage 126 may include one or both of system storage that is provided integrally (i.e., substantially non-removable) with aerial vehicle 106 and/or removable storage that is removably connectable to aerial vehicle 106 via, for example, a port (e.g., a USB port, a firewire port, etc.) or a drive (e.g., a disk drive, etc.). Electronic storage 126 may include one or more optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126 may include one or more virtual storage resources (e.g., cloud storage, a virtual private network, and/or other virtual storage resources). Electronic storage 126 may store software algorithms, information determined by processor 122, information received from sensors, and/or other information that enables system 100 to function as described herein.

The system 100 may comprise at least one mounting device 130 configured to mount the photo sensors 110 to an aerial vehicle 106. The mounting device 130 may be configured to orient at least one set of photo sensors 110 such that the photo sensors 110 may obtain spectral measurements of the one or more ambient light sources 107.

The mounting device 130 may be manually configured such that the photo sensors 110 may be orientated to obtain spectral measurements of the ambient light source(s). For example, the ambient light source may be a naturally occurring light source, such as the Sun. When the aerial vehicle 106 is travelling in a first direction, the ambient light source may be relatively stationary with respect to the aerial vehicle 106 and therefore the mounting device 130 may be manually set, such that the photo sensors 110 are orientated to obtain spectral measurements of the ambient light source(s).

Figure 5:
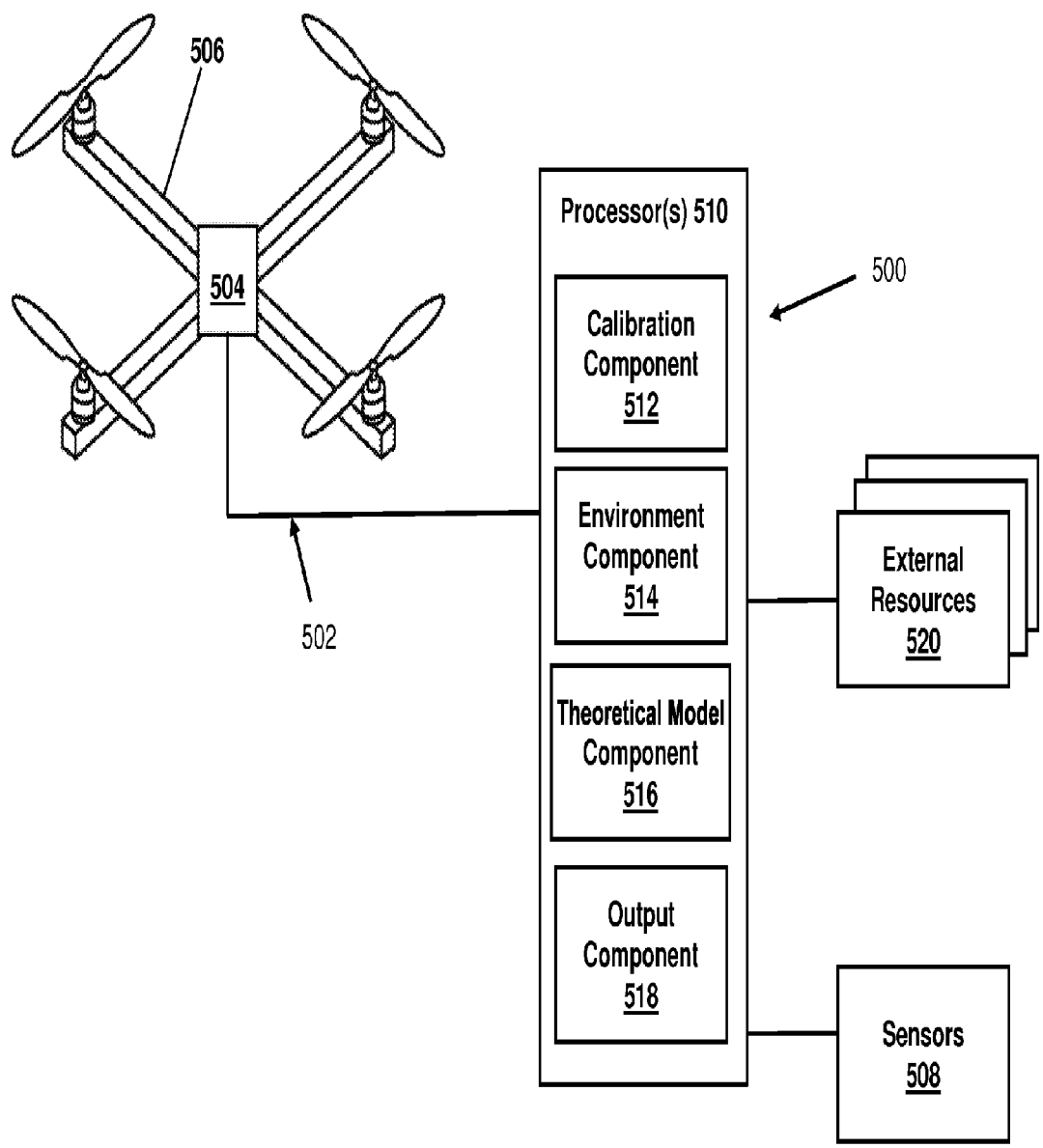
FIG. 5 illustrates a system for obtaining calibrated spectral measurements of a target, in accordance with one or more implementations.

The system 100 may comprise a mounting angle sensor configured to obtain measurements of the angle at which the photo sensors 110 are positioned with respect to the incident light from the ambient light source(s) 107. The relationship between the intensity of the spectral measurement and the angle of incidence between the ambient light source(s) 107 and the photo sensor(s) 110 can be obtained. The relationship may be stored. The photo sensor(s) 110 may be rigidly mounted to the aircraft. The attitude sensor 127 may be configured to facilitate determination of the attitude of the photo sensor(s) 110 with respect to a frame of reference. One such frame of reference may be the Earth. The obtained attitude of the photo sensor(s) may be recorded concurrently, or near concurrently, with the spectral measurement(s) of the ambient light source(s) 107 and/or target(s) 102. The time and geo-location information may be obtained concurrently with the one or more spectral measurement(s) of the ambient light source(s) 107 and/or target(s) 102. The obtained time and geo-location information may facilitate determination of the solar elevation and azimuth angles. The angle of incidence of the light source relative to the sensor may be determined based on the obtained attitude information, the sensor(s) 110, and/or the determined solar angles. The angle of incidence along with the determined relationship between the angle of incidence and the measurement intensity of the spectral measurement may be stored so the ambient light source(s) 107 may be used to correct the spectral measurements of the ambient light source(s) 107. FIG. 5 illustrates a system for obtaining calibrated spectral images and/or measurements of a target, in accordance with one or more implementations. One aspect of the present disclosure relates to a system 500 for obtaining calibrated spectral images and/or measurements. The system 500 may comprise one or more data connections 502 configured to electronically connect to one or more electronic data storage mediums 504 and/or one or more sensors 508, on an aerial vehicle 506. The one or more data connections 502 may be wired and/or wireless connections. The data connection(s) 502 may be configured to continuously provide data from the electronic storage mediums and/or the sensors on the aerial vehicle 506. The data connection(s) 502 may be configured to periodically provide data from the electronic storage 504 and/or the sensors 508 on the aerial vehicle 506. The data connection(s) 502 may be configured to provide data from the electronic storage 504 and/or the sensors on the aerial vehicle 506 when connected to devices configured to retrieve the data, wherein the devices download all, substantially all, or select portions, of the data. The electronic data storage 504 may be configured to store spectral measurements of a target taken from an aerial vehicle 506. The electronic storage 504 may be configured to store spectral measurements of one or more ambient light sources.

The system 500 may comprise one or more physical computer processors 510 configured by machine-readable instructions to perform the functions of one or more computer components. The one or more computer components may comprise a calibration component 512, an environmental component 514, a theoretical model component 516, an output component 518, and/or other components.

The processor 510 may provide processing capabilities to the system 500. The processor 510 may include one or more of a digital processor, an analog processor, a digital circuit designed to process information, an analog circuit designed to process information, a state machine, and/or other mechanisms for electronically processing information. Although processor 510 is shown in FIG. 5 as a single entity, this is for illustrative purposes only. In some implementations, processor 510 may include a plurality of processing units. These processing units may be physically located within the same device, or processor 510 may represent processing functionality of a plurality of devices operating in coordination. The processor 510 may be configured to execute components 512, 514, 516, 518, and/or other components. Processor 510 may be configured to execute components 512, 514, 516, 518, and/or other components by software; hardware; firmware; some combination of software, hardware, and/or firmware; and/or other mechanisms for configuring processing capabilities on processor 510.

It should be appreciated that although components 512, 514, 516, and 518 are illustrated in FIG. 5 as being co-located within a single processing unit, in implementations in which processor 510 includes multiple processing units, one or more of components 512, 514, 516, 518, and/or other components may be located remotely from the other components. The description of the functionality provided by the different components 512, 514, 516, 518, and/or other components described below is for illustrative purposes, and is not intended to be limiting, as any of components 512, 514, 516, 518, and/or other components may provide more or less functionality than is described. For example, one or more of components 512, 514, 516, 518, and/or other components may be eliminated, and some or all of its functionality may be provided by other ones of components 512, 514, 516, 518, and/or other components. As another example, processor 510 may be configured to execute one or more additional modules that may perform some or all of the functionality attributed below to one of modules 512, 514, 516, 518, and/or other components.

The calibration component 512 may be configured to determine sets of calibration values for the spectral measurements of the target. The sets of calibration values may be determined based on the obtained spectral measurements of the one or more ambient light sources.

The environmental component 514 may be configured to obtain sets of environmental parameters associated with the spectral measurements of the target and the spectral measurements of the one or more ambient light sources. The environmental parameters may include temperature measurements of and/or adjacent to the multiple photo sensors configured to obtain spectral measurements of the one or more ambient light sources. Temperature measurements of the photo sensors may be obtained to correct for thermal responsivity effects of the photo sensors. The temperature measurements may be obtained by one or more sensors 508 on the aerial vehicle 506.

The environmental parameters may include one or more of the geographical location, the altitude, the transmission properties of the optics, the responsivity properties of the photo sensors, and/or other environmental parameters. The environmental parameters may include one or more of the time of year the measurements were taken, the time of day the measurements were taken, the atmospheric properties at the time the measurements were taken, and/or other environmental parameters.

The environmental parameter information may be obtained from one or more sensors 508. The sensors may be mounted on the aerial vehicle 506. The sensors may be external to the aerial vehicle 506. For example, the sensors may be on the ground, on other aerial vehicles, and/or in locations remote from where the measurements are being taken. The environmental parameter information may be obtained from external resources 520. External resources 520 may be one or more local sensors 508. External resources 520 may be information entered into the system by a user. The external resources 520 may be databases in electronic communication with the system 500. For example, the external resources may be national weather service information, atmospheric information, and/or other information available from external sources.

The theoretical model component 516 may be configured to determine a theoretical irradiance model for the target based on the obtained sets of environmental parameters. The theoretical model component 516 may be configured to determine the theoretical irradiance model for the target based on an atmospheric transmission model.

The calibration value component 512 may be configured to determine sets of calibration values for the spectral measurements of the target. The sets of calibration values may be determined based on the obtained spectral measurements of the one or more ambient light sources and the theoretical irradiance model for the target, which itself is based on the obtained environmental parameters associated with the measurements.

The calibration value component 512 may be configured to determine a calibration value for individual ones of the spectral measurements of the target. For example, where the spectral imaging devices are configured to obtain spectral measurements of a target in a first set of spectral frequency ranges and/or bands, a calibration value may be determined for individual ones of the spectral frequency ranges and/or bands in the first set of spectral frequency ranges and/or bands.

The calibration value component 512 may be configured to scale the spectral measurements of the target with the determined sets of calibration values. Scaling the spectral measurements of the target with the determined sets of calibration values may provide spectral measurements of the target that are independent, or nearly independent, of ambient light illumination conditions.

The output component 518 may be configured to provide one or more outputs of data comprising the scaled spectral measurements of the target. The outputted data may be used to deduce and/or obtain information about the target.

The one or more electronic data connections 502 may be configured to obtain time data from the electronic storage 504. The time data may be associated with the spectral measurements of the target and the spectral measurements of the one or more ambient light sources.

Figure 6:
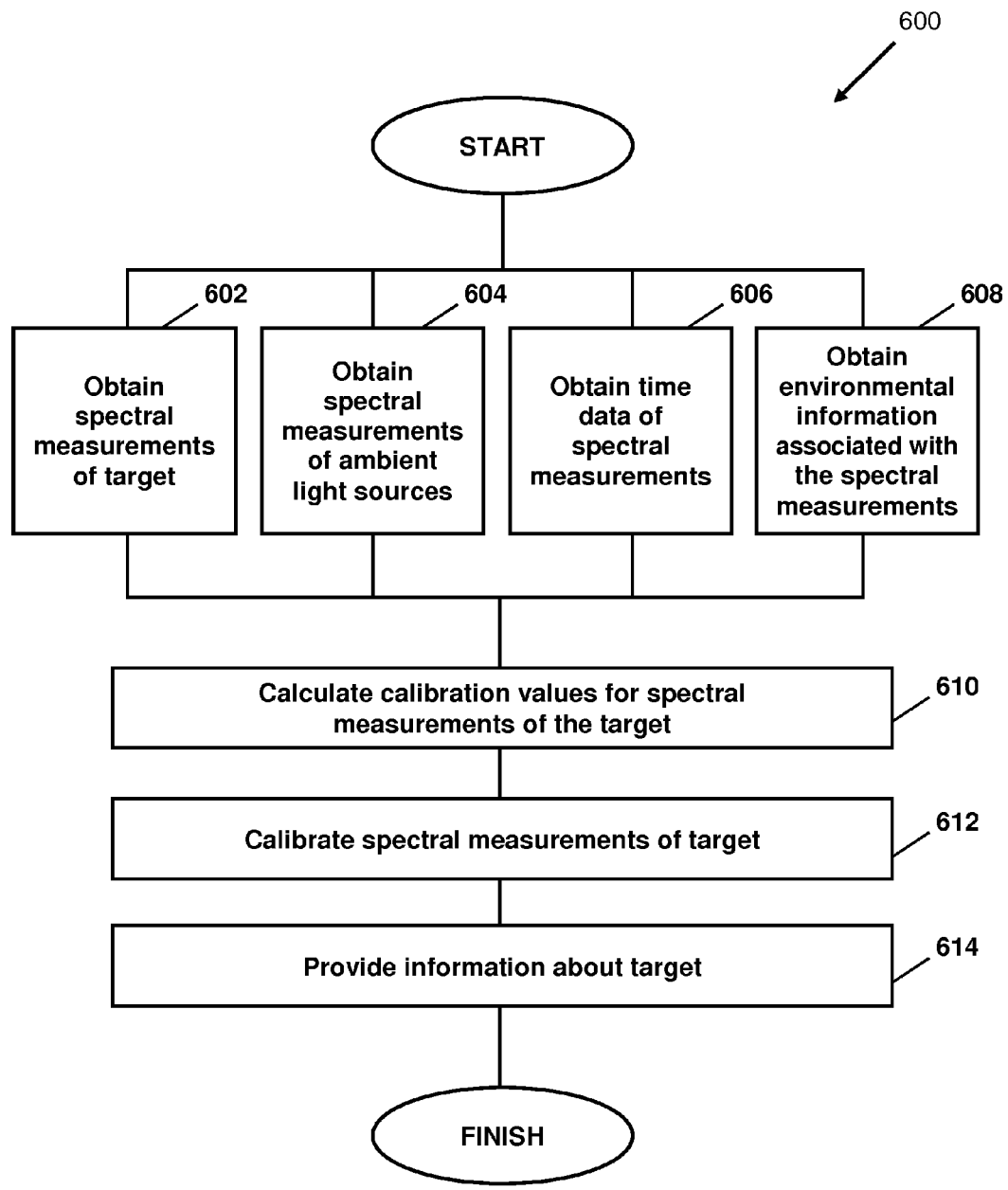
FIG. 6 illustrates a method for obtaining calibrated spectral measurements of a target, in accordance with one or more implementations.
Figure 7:
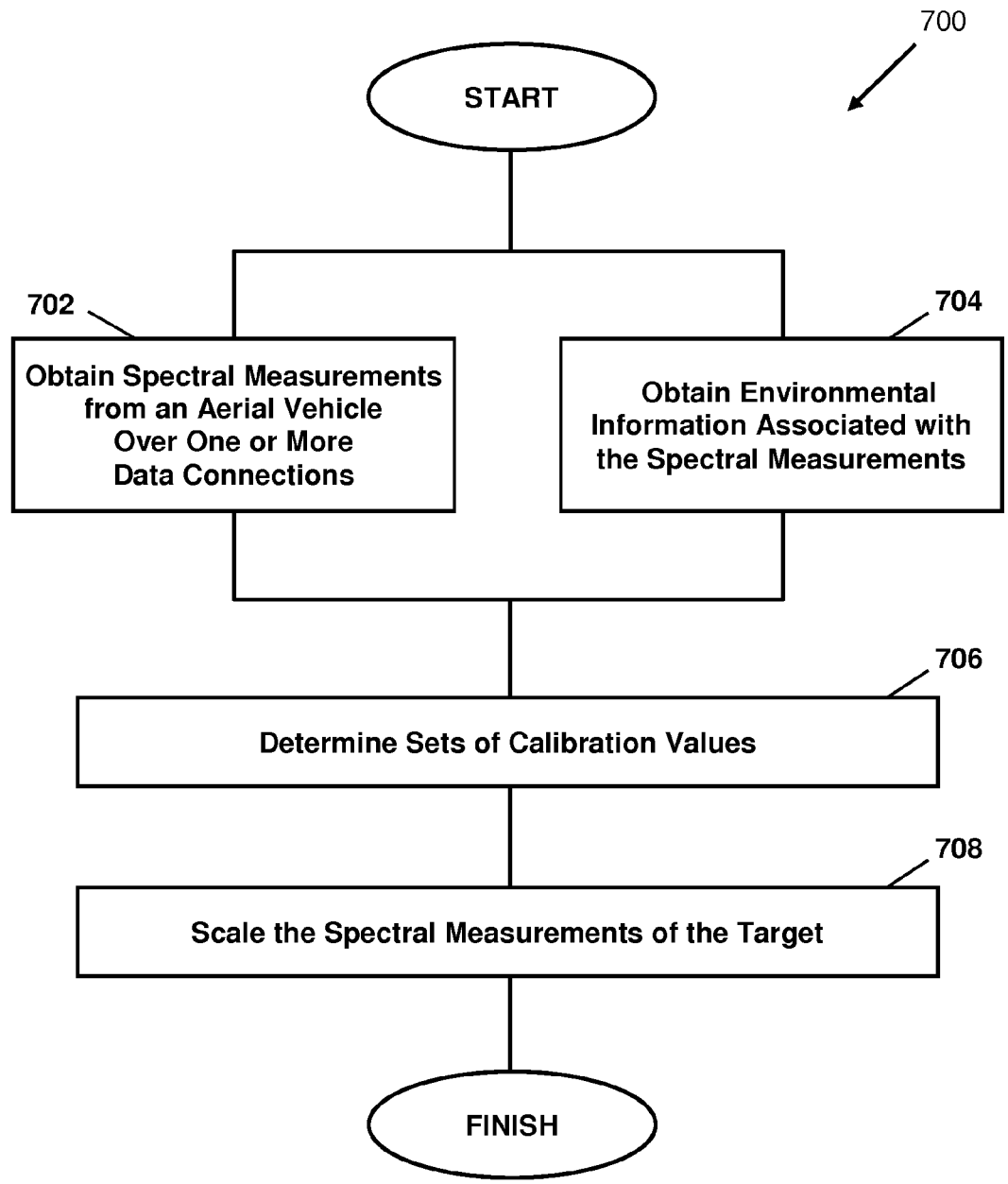
FIG. 7 illustrates a method for calibrating spectral measurements of a target, in accordance with one or more implementations; and, FIG. 8 illustrates a method for analyzing data of spectral measurements, in accordance with one or more implementations.
Figure 8:
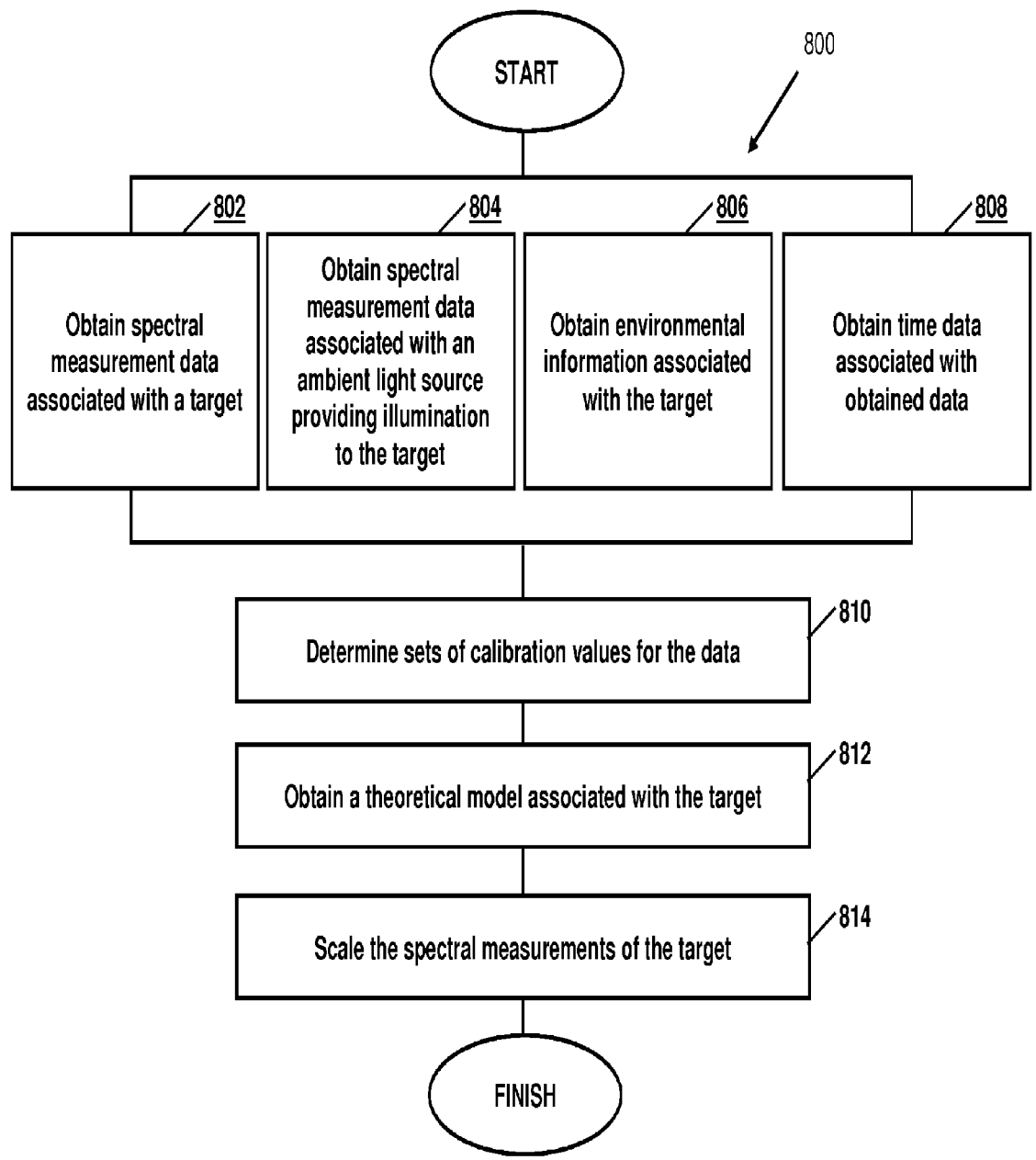

FIG. 6 illustrates a method 600 for calibrating spectral measurements of a target, in accordance with one or more implementations. FIG. 7 illustrates a method 700 for calibrating spectral measurements of a target, in accordance with one or more implementations. FIG. 8, illustrates a method 800 for calibrating obtained spectral measurement data, in accordance with one or more implementations. The operations of methods 600, 700, and 800 presented below are intended to be illustrative. In some embodiments, methods 600, 700, and 800 may be accomplished with one or more additional operations not described, and/or without one or more of the operations discussed, and/or in combination with each other. Additionally, the order in which the operations of methods 600, 700, and 800 are illustrated in FIGS. 6, 7, and 8, respectively, and described below, are not intended to be limiting.

In some embodiments, methods 600, 700, and 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 600, 700, and 800 in response to instructions stored electronically on an electronic storage medium. The one or more processing devices may include one or more devices configured through hardware, firmware, and/or software to be specifically designed for execution of one or more of the operations of methods 600, 700, and 800. In some embodiments, methods 600, 700, and 800 may be implemented in combinations of one or more processing devices, machines, human interaction, and/or by other elements capable of carrying out the operations of methods 600, 700, and 800.

With reference to FIG. 6, at an operation 602 spectral measurements of a target from an aerial vehicle may be obtained. The target may be vegetation, infrastructure, water, land, and/or any target of which it is desirous to obtain spectral measurements. The target may be illuminated by one or more ambient light sources. The spectral measurements may include a first set of measurements of the target. The first set of measurements of the target may include a spectral measurement of the target taken at a first spectral frequency range. The first set of measurements of the target may include a spectral measurement of the target taken at a second, third, fourth, fifth, or more, spectral frequency ranges.

At an operation 604, the method may comprise obtaining spectral measurements of the one or more ambient light sources from the aerial vehicle. The individual ones of the spectral measurements of the ambient light source(s) may have a peak response parameter range approximate to the frequency ranges of individual ones of the first set of spectral frequency ranges. For example, a first spectral measurement of the ambient light source(s) may have a peak response parameter range approximate to the first spectral frequency range of the first set of spectral measurements of the target. A second spectral measurement of the ambient light source(s) may have a peak response parameter range approximate to the second spectral frequency range of the first set of spectral measurements of the target. The obtained spectral measurements of the one or more ambient light sources may be used during calibration of the obtained spectral measurements of the target, such that the first set of measurements of the target are scaled based on the first spectral measurement of the ambient light source(s) and the second spectral measurement of the ambient light source(s).

At operations 602 and 604, the obtained spectral measurements of the target and the obtained spectral measurements of the one or more ambient light sources may be received into electronic storage, such that the electronic storage receives the first set of measurements of the target and the first set of measurements of the ambient light source.

At an operation 606, time data associated with the obtained spectral measurements of the target and/or the ambient light source (s) may be obtained. For example, a first set of time data may be obtained for the first set of measurements of the target and/or the first set of spectral measurements of the ambient light source(s). At the operation 606, time data associated with the obtained measurements and/or observations of all sensors may be obtained. The time data may be obtained individually for the individual sensors. A single set of time data may be obtained for all measurements and/or observations taken concurrently, or near concurrently.

The method 600 may comprise obtaining any number of spectral measurements at any number of frequency ranges, wherein the sensors have peak response frequencies within the frequency ranges. For example, the first set of spectral measurements of the target may comprise obtaining a third, fourth, fifth, and/or more spectral measurements of the target(s) and/or ambient light source(s) over a third, fourth, fifth, and/or more discrete frequency ranges. The third, fourth, fifth, and/or more sets of spectral measurements may be taken by sensor(s) having peak response frequencies within a third, fourth, fifth, and/or more spectral frequency ranges. The first, second, third, fourth, fifth, and/or other spectral frequency ranges may be different. The first, second, third, fourth, fifth, and/or other spectral frequency ranges may be overlapping, wherein individual ones of the spectral frequency ranges overlap one or more others of the individual ones of the spectral frequency ranges.

At an operation 608, sets of environmental parameters associated with the spectral measurements of the target and/or the spectral measurements of the one or more ambient light sources may be obtained. The environmental parameters obtained may be the environmental parameters disclosed herein.

At an operation 610 the calibration values for the spectral measurements of the target may be calculated. The operations conducted at operation 610 may be performed by a calibration value component, such as calibration value component 612.

At an operation 612, spectral measurements of the target may be calibrated. At the operation 612, the theoretical irradiance model for the target based on the obtained sets of environmental parameters may be determined. At the operation 612, sets of calibration values may be determined for the spectral measurements of the target, wherein the sets of calibration values are determined based on the obtained spectral measurements of the one or more ambient light sources and the theoretical irradiance model for the target.

At an operation 614, information about the target may be provided based on the calibrated spectral information of the target.

Referring to FIG. 7, another aspect of the disclosure relates to a method 700 for calibrating spectral imaging measurements. At an operation 702, spectral measurements of a target and spectral measurements of one or more ambient light sources may be obtained from an aerial vehicle, over one or more data connections.

At an operation 704, environmental information about the obtained spectral measurements may be obtained. The environmental information may be obtained from one or more local sensors and/or from one or more external resources as described above.

At an operation 706, sets of calibration values for the spectral measurements of the target may be determined. The sets of calibration values may be determined by one or more processors. The sets of calibration values may be determined based on the obtained spectral measurements of the one or more ambient light sources. The sets of calibration values may be determined based on the obtained environmental information associated with the spectral measurements.

At an operation 708, the spectral measurements of the target may be scaled with the determined sets of calibration values.

FIG. 8 illustrates a method 800 of analyzing data of spectral measurements in accordance with one or more implementations.

At an operation 802, spectral measurement data associated with a target may be obtained. At an operation 804, spectral measurement data associated with one or more ambient light sources may be obtained. At an operation 806, environmental information associated with the target and/or ambient light source(s) may be obtained. At an operation 808, time data associated with the spectral measurements of the target and/or ambient light source(s), and/or other measurements, may be obtained.

The data obtained at operations 802, 804, 806, 808, and/or other data, may be obtained from electronic storage, such as electronic storage 126. The data obtained at operation 802,

804, 806, 808, and/or other data, may be obtained over one or more electronic connections, such as hard-wired electronic connections, wireless electronic connections, and/or other electronic connections. The data obtained at operation 802, 804, 806, 808, and/or other data, may be obtained at a client computing device, such as a laptop, desktop, handheld device, smart device, and/or other client computing device. The data obtained at operation 802, 804, 806, 808, and/or other data, may be obtained at a server remote from the client computing device.

At an operation 810, sets of calibration values for the obtained spectral measurement data of one or more targets may be determined. At an operation 812, sets of calibration values for the theoretical model associated with the target may be obtained. At an operation 814, the spectral measurements of the target may be scaled based on the determined calibration values. Operations 810, 812, 814, and/or other operations, may be performed by a client device in electronic communication with the electronic storage device associated with an aircraft. Operations 810, 812, 814, and/or other operations, may be performed by a server. The operations 810, 812, 814, and/or other operations, may be performed by a service provider remote from the aircraft and/or the client computing device(s) associated with the user of the aircraft.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to be disposed on an aerial vehicle to obtain images of an agricultural land area target at different spectral bands that are calibrated for ambient lighting conditions, the system comprising:

four imaging devices consisting of a first imaging device, a second imaging device, a third imaging device, and a fourth imaging device, wherein:

the first imaging device is configured to obtain first image data of the target that correspond to a first discrete spectral frequency range centered on a first spectral frequency;

the second imaging device is configured to obtain second image data of the target that correspond to a second discrete spectral frequency range centered on a second spectral frequency;

the third imaging device is configured to obtain third image data of the target that correspond to a third discrete spectral frequency range centered on a third spectral frequency;

the fourth imaging device is configured to obtain fourth image data of the target that correspond to a fourth discrete spectral frequency range centered on a fourth spectral frequency;

the first spectral frequency, the second spectral frequency, the third spectral frequency, and the fourth spectral frequency are each different from each other;

a processor configured to obtain time and geo-location information, wherein the time and geo-location information is concurrently obtained with the first, second, third, and fourth images; and a photo sensor apparatus disposed near the four imaging devices, the photo sensor apparatus being configured to measure ambient lighting conditions at each of the first discrete spectral frequency range, the second discrete spectral frequency range, the third discrete spectral frequency range, and the fourth discrete spectral frequency range;

wherein the first image data, the second image data, the third image data, and the fourth image data are calibrated based on the measurements of the ambient lighting conditions from the photo sensor apparatus at the first discrete spectral frequency range, the second discrete spectral frequency range, the third discrete spectral frequency range, the fourth discrete spectral frequency range, and the time and geo-location information.

2. The system of claim 1, wherein:

the first discrete spectral frequency range includes green light;

the second discrete spectral frequency range includes red light;

the third discrete spectral frequency range lies between red light and near-infrared light; and the fourth discrete spectral frequency range includes near-infrared light.

3. The system of claim 1, wherein the four imaging devices obtain spectrally overlapping image data as the aerial vehicle moves.

4. The system of claim 1, wherein the calibrated image data conveys absolute reflectance at each of the first discrete spectral frequency range, the second discrete spectral frequency range, the third discrete spectral frequency range, and the fourth discrete spectral frequency range.

5. The system of claim 1, where an orientation of the four sensors is factored into the calibration of the first image data, the second image data, the third image data, and the fourth image data.

6. The system of claim 1, wherein the photo sensor apparatus includes four photo sensors consisting of a first photo sensor, a second photo sensor, a third photo sensor, and a fourth photo sensor, such that:

the first photo sensor is configured to obtain measurements of ambient lighting conditions that correspond to the first discrete spectral frequency range centered on the first spectral frequency;

the second photo sensor is configured to obtain measurements of ambient lighting conditions that correspond to the second discrete spectral frequency range centered on the second spectral frequency;

the third photo sensor is configured to obtain measurements of ambient lighting conditions that correspond to the third discrete spectral frequency range centered on the third spectral frequency; and the fourth photo sensor is configured to obtain measurements of ambient lighting conditions that correspond to the fourth discrete spectral frequency range centered on the fourth spectral frequency.

7. The system of claim 1, further comprising an RGB camera for capturing images in the visible spectrum and for providing a clear picture of the agricultural land area target.

8. The system of claim 1, wherein the photo sensor apparatus is further configured to measure ambient lighting conditions across a continuous spectral range that encompasses each of the first discrete spectral frequency range, the second discrete spectral frequency range, the third discrete spectral frequency range, and the fourth discrete spectral frequency range.

9. A kit comprising:
a multispectral sensor apparatus configured to be disposed on an aerial vehicle to obtain images of an agricultural land area target at different spectral bands that are calibrated for ambient lighting conditions, the multispectral sensor apparatus comprising a first imaging device, a second imaging device, a third imaging device, a fourth imaging device, and a processor, wherein:
the first imaging device is configured to obtain first image data of the target that correspond to a first discrete spectral frequency range centered on a first spectral frequency;
the second imaging device is configured to obtain second image data of the target that correspond to a second discrete spectral frequency range centered on a second spectral frequency;
the third imaging device is configured to obtain third image data of the target that correspond to a third discrete spectral frequency range centered on a third spectral frequency;
the fourth imaging device is configured to obtain fourth image data of the target that correspond to a fourth discrete spectral frequency range centered on a fourth spectral frequency; and
the processor is configured to obtain time and geo-location information, wherein the time and geo-location information is concurrently obtained with the first, second, third, and fourth images, and
the first spectral frequency, the second spectral frequency, the third spectral frequency, and the fourth spectral frequency are each different from each other; and
a sunshine sensor apparatus configured to be disposed near the multispectral sensor apparatus during use, the sunshine sensor apparatus being configured to measure ambient lighting conditions at each of the first discrete spectral frequency range, the second discrete spectral frequency range, the third discrete spectral frequency range, and the fourth discrete spectral frequency range;
wherein the first image data, the second image data, the third image data, and the fourth image data are calibrated based on the measurements of the ambient lighting conditions from the sunshine sensor apparatus at the first discrete spectral frequency range, the second discrete spectral frequency range, the third discrete spectral frequency range, the fourth discrete spectral frequency range, and the time and geolocation information.

10. The kit of claim 9, wherein:
the first discrete spectral frequency range includes green light;
the second discrete spectral frequency range includes red light;
the third discrete spectral frequency range lies between red light and near-infrared light; and
the fourth discrete spectral frequency range includes near-infrared light.

11. The kit of claim 9, wherein the multispectral sensor apparatus obtains spectrally overlapping image data as the aerial vehicle moves.

12. The kit of claim 9, wherein the calibrated image data conveys absolute reflectance at each of the first discrete spectral frequency range, the second discrete spectral frequency range, the third discrete spectral frequency range, and the fourth discrete spectral frequency range.

13. The kit of claim 9, where an orientation of the multispectral sensor apparatus is factored into the calibration of the first image data, the second image data, the third image data, and the fourth image data.

14. The kit of claim 9, wherein the sunshine sensor apparatus includes four photo sensors consisting of a first photo sensor, a second photo sensor, a third photo sensor, and a fourth photo sensor, such that:
the first photo sensor is configured to obtain measurements of ambient lighting conditions that correspond to the first discrete spectral frequency range centered on the first spectral frequency;
the second photo sensor is configured to obtain measurements of ambient lighting conditions that correspond to the second discrete spectral frequency range centered on the second spectral frequency;
the third photo sensor is configured to obtain measurements of ambient lighting conditions that correspond to the third discrete spectral frequency range centered on the third spectral frequency; and
the fourth photo sensor is configured to obtain measurements of ambient lighting conditions that correspond to the fourth discrete spectral frequency range centered on the fourth spectral frequency.

15. The kit of claim 9, further comprising an RGB camera for capturing images in the visible spectrum and for providing a clear picture of the agricultural land area target.

16. An aerial vehicle, comprising:
a multispectral sensor apparatus configured to obtain images of an agricultural land area target at different spectral bands that are calibrated for ambient lighting conditions, the multispectral sensor apparatus comprising a first imaging device, a second imaging device, a third imaging device, a fourth imaging device, and a processor, wherein:
the first imaging device is configured to obtain first image data of the target that correspond to a first discrete spectral frequency range centered on a first spectral frequency;
the second imaging device is configured to obtain second image data of the target that correspond to a second discrete spectral frequency range centered on a second spectral frequency;
the third imaging device is configured to obtain third image data of the target that correspond to a third discrete spectral frequency range centered on a third spectral frequency;
the fourth imaging device is configured to obtain fourth image data of the target that correspond to a fourth discrete spectral frequency range centered on a fourth spectral frequency;
the processor is configured to obtain time and geo-location information, wherein the time and geo-location information is concurrently obtained with the first, second, third, and fourth images, and wherein
the first spectral frequency, the second spectral frequency, the third spectral frequency, and the fourth spectral frequency are each different from each other; and
a sunshine sensor apparatus configured to be disposed near the multispectral sensor apparatus during use, the sunshine sensor apparatus being configured to measure ambient lighting conditions at each of the first discrete spectral frequency range, the second discrete spectral frequency range, the third discrete spectral frequency range, and the fourth discrete spectral frequency range;

wherein the first image data, the second image data, the third image data, and the fourth image data are calibrated based on the measurements of the ambient lighting conditions from the sunshine sensor apparatus at the first discrete spectral frequency range, the second discrete spectral frequency range, the third discrete spectral frequency range, the fourth discrete spectral frequency range, and the time and geolocation information.

17. The aerial vehicle of claim 16, wherein the calibrated image data conveys absolute reflectance at each of the first discrete spectral frequency range, the second discrete spectral frequency range, the third discrete spectral frequency range, and the fourth discrete spectral frequency range.

18. A system configured to be disposed on an aerial vehicle to obtain images of an agricultural land area target at different spectral bands that are calibrated for ambient lighting conditions, the system comprising:
  two imaging devices consisting of a first imaging device and a second imaging device, wherein:
  the first imaging device is configured to obtain first image data of the target that correspond to a first discrete spectral frequency range centered on a first spectral frequency;
  the second imaging device is configured to obtain second image data of the target that correspond to a second discrete spectral frequency range centered on a second spectral frequency; and
  the first spectral frequency and the second spectral frequency are different from each other;
  a processor configured to obtain time and geo-location information, wherein the time and geo-location information is concurrently obtained with the first, and second images; and
  a photo sensor apparatus disposed near the two imaging devices, the photo sensor apparatus being configured to measure ambient lighting conditions at each of the first discrete spectral frequency range and the second discrete spectral frequency range;
  wherein the first image data, and the second image data are calibrated based on the measurements of the ambient lighting conditions from the photo sensor apparatus at the first discrete spectral frequency range, the second discrete spectral frequency range, and the time and geo-location information.

* * * * *